(12) United States Patent
Pouet

(10) Patent No.: US 7,729,881 B2
(45) Date of Patent: Jun. 1, 2010

(54) LASER INTENSITY NOISE REJECTION FOR INTEROMETRIC APPARATUS

(75) Inventor: Bruno Francois Pouet, Los Angeles, CA (US)

(73) Assignee: Bossa Nova Technologies, LLC, Venice, CA (US)

( * ) Notice: Subject to any disclaimer, the term of this patent is extended or adjusted under 35 U.S.C. 154(b) by 15 days.

(21) Appl. No.: 11/970,971

(22) Filed: Jan. 8, 2008

(65) Prior Publication Data

US 2008/0167831 A1 Jul. 10, 2008

Related U.S. Application Data

(60) Provisional application No. 60/878,834, filed on Jan. 8, 2007.

(51) Int. Cl.
*G01C 22/00* (2006.01)
(52) U.S. Cl. ..................................... 702/158
(58) Field of Classification Search ................ 702/158
See application file for complete search history.

(56) References Cited

U.S. PATENT DOCUMENTS 5,131,748 A * 7/1992 Monchalin et al. .......... 356/486

FOREIGN PATENT DOCUMENTS

WO WO 2005/062941 * 7/2005

* cited by examiner

*Primary Examiner*—Aditya Bhat
(74) *Attorney, Agent, or Firm*—Osha • Liang LLP

(57) ABSTRACT

A laser interferometric apparatus for measuring a displacement of an object is disclosed, the apparatus comprising a laser source for producing a laser beam having a given intensity, a beam splitter for dividing the laser beam into a reference beam and an object beam to be directed to the object, thereby producing a scattered object beam being modulated according to the displacement of the object, interference means adapted to provide at least two electrical interference signals from the scattered object beam and the reference beam, the at least two electrical interference signals each comprising a wanted signal component indicative of the object displacement and an intensity noise component, and processing means for subtracting the at least two electrical interference signals, thereby generating an output signal, the output signal comprising substantially the wanted signal component alone, wherein the intensity noise is substantially rejected.

15 Claims, 6 Drawing Sheets

LASER INTENSITY NOISE REJECTION FOR INTERFEROMETRIC APPARATUS

BACKGROUND OF INVENTION

1. Field of the Invention

The invention relates generally to noise rejection in interferometric displacement measurements.

2. Background Art

Interferometry is a well known technique for measuring the phase difference between two or more optical beams. Two-beam interferometers, where one of the optical beams is back reflected by an object surface and the other beam is used as a reference, are used to monitor small deformations on an object under test or small displacements of a surface of a workpiece under test.

Multi-speckle interferometers are able to collect a larger amount of light compared to single-speckle interferometers. Increase in the amount of collected light leads to an increase of the interferometer sensitivity. Multi-speckle interferometry may be performed using, for example, confocal Fabry-Perot or multi-channel quadrature interferometers, or two-wave mixing in a photorefractive crystal. A Michelson interferometer is a typical single-speckle interferometer.

Multi-speckle interferometers may be used to detect displacements of an object that is subjected to ultrasound. Laser ultrasonics can advantageously be used for nondestructive testing in order to measure the thickness of objects or to monitor defects in materials. Industrial applications involve the inspection of an optically rough surface, leading to the ultrasonic information being encoded in a laser beam with speckles.

Like every detection system, multi-speckle interferometers are subjected to noise, i.e., electronic noise, shot noise, laser phase noise, and laser intensity noise.

The phase noise is related to the coherence of the laser and needs to be considered when the path difference between the interfering beams is no longer small compared to the coherence length of the laser. For dual-beam interferometers, the coherence length requirement is not critical since the signal and reference beam paths can be made nearly equal. With current laser technology, laser coherence lengths of several meters are commonly available, thus reducing phase noise considerably.

Electronic noise adds an unwanted characteristic of an electronic circuit to the wanted signal. The electronic noise may be considered independent of the intensity of the light detected by a detector. It may, for example, only depend on the first amplifier stage used to amplify a weak photo-detector current. In a well-designed system, the electronic noise should only amount to a small fraction of the total noise.

The shot noise is the quantum noise due the light-to-electrical conversion in the detector, such as a photodiode. In the case of a coherent light source, shot noise increases with the square root of the intensity arriving on the detector.

Laser intensity noise usually results from vibrations of the laser cavity or fluctuations in the gain medium of the laser. Typically, intensity noise is proportional to the laser intensity. At ultrasound frequencies below a few MHz, the intensity noise can quickly become the limiting factor for the interferometer sensitivity. It is possible to use specific lasers with low intensity noise, but these are expensive.

It is an aim of the invention to reject the laser intensity noise such that the shot noise is the dominant noise source in the system. This way, the interferometric system may achieve its theoretical sensitivity limit without using specific lasers.

One method of rejecting intensity noise is balanced detection, as described, for example, in C. B. Scruby and L. E. Drain, "Laser Ultrasonics—Techniques and Applications", Ed. Adam Hilger, Bristol, UK (1990). In a detection-balanced interferometer, two interference beams of equal intensity and opposite phases, both carrying the surface information from the object, are detected using two photo-detectors. The two electrical signals corresponding to the interference beams are then subtracted so that the phase information is summed up and the intensity noise is cancelled out. However, balanced detection is more difficult and expensive to implement since the optical set-up necessary to properly align the intensity and the phase of the two interference beams is more complex.

Another method to reject intensity noise is an all-electronic method as described, for example, in Philip C. D. Hobbs, "Ultrasensitive laser measurements without tears", Applied Optics, Vol. 36, No. 4, February 1997 (also in U.S. Pat. No. 5,134,276). In an all-electronic scheme, photocurrents generated by an interference beam and a comparison beam sampled at the laser output are processed. The two photocurrents are combined to obtain an output signal where intensity noise has been rejected. The combination may be provided through subtraction or division of the photocurrents. In both cases, the comparison beam draws off intensity from the total laser output intensity that can hence not be used for the interferometric measurement.

The invention aims at providing an interferometer that is able to reject laser intensity noise without increasing shot noise, and, at the same time, to use as much of the available laser light as possible to obtain the highest possible sensitivity of the interferometric system.

SUMMARY OF INVENTION

In a first aspect, embodiments disclosed herein relate to a laser interferometric apparatus for measuring a displacement of an abject, the apparatus comprising a laser source for producing a laser beam having a given intensity, a beam splitter for dividing the laser beam into a reference beam and an object beam to be directed to the object, thereby producing a scattered object beam being modulated according to the displacement of the object, interference means adapted to provide at least two electrical interference signals from the scattered object beam and the reference beam, the at least two electrical interference signals each comprising a wanted signal component indicative of the of the object displacement and an intensity noise component, and processing means comprising subtracting means for subtracting the at least two electrical interference signals, thereby generating a displacement signal, the displacement signal comprising substantially the wanted signal component alone, wherein the intensity noise is substantially rejected.

In a second aspect, embodiments disclosed herein relate to a method for measuring a displacement of an object, the method comprising generating a laser beam having a given intensity, dividing the laser beam into a reference beam and an object beam to be directed to the object, thereby producing a scattered object beam being modulated according to the displacement of the object, generating at least two electrical interference signals from the scattered object beam and the reference beam, the at least two electrical interference signals each comprising a wanted signal component indicative of the of the object displacement and an intensity noise component, and processing the at least two electrical interference signals, the processing comprising subtracting the at least two electrical interference signals, thereby generating an output signal, the output signal comprising substantially the wanted signal component alone, wherein the intensity noise is substantially rejected.

Other aspects, characteristics, and advantages of the invention will be apparent from the following detailed description and the appended claims.

DETAILED DESCRIPTION

In a first aspect, embodiments disclosed herein provide an interferometric apparatus adapted to measure a displacement of an object subjected to ultrasound.

Figure 1:
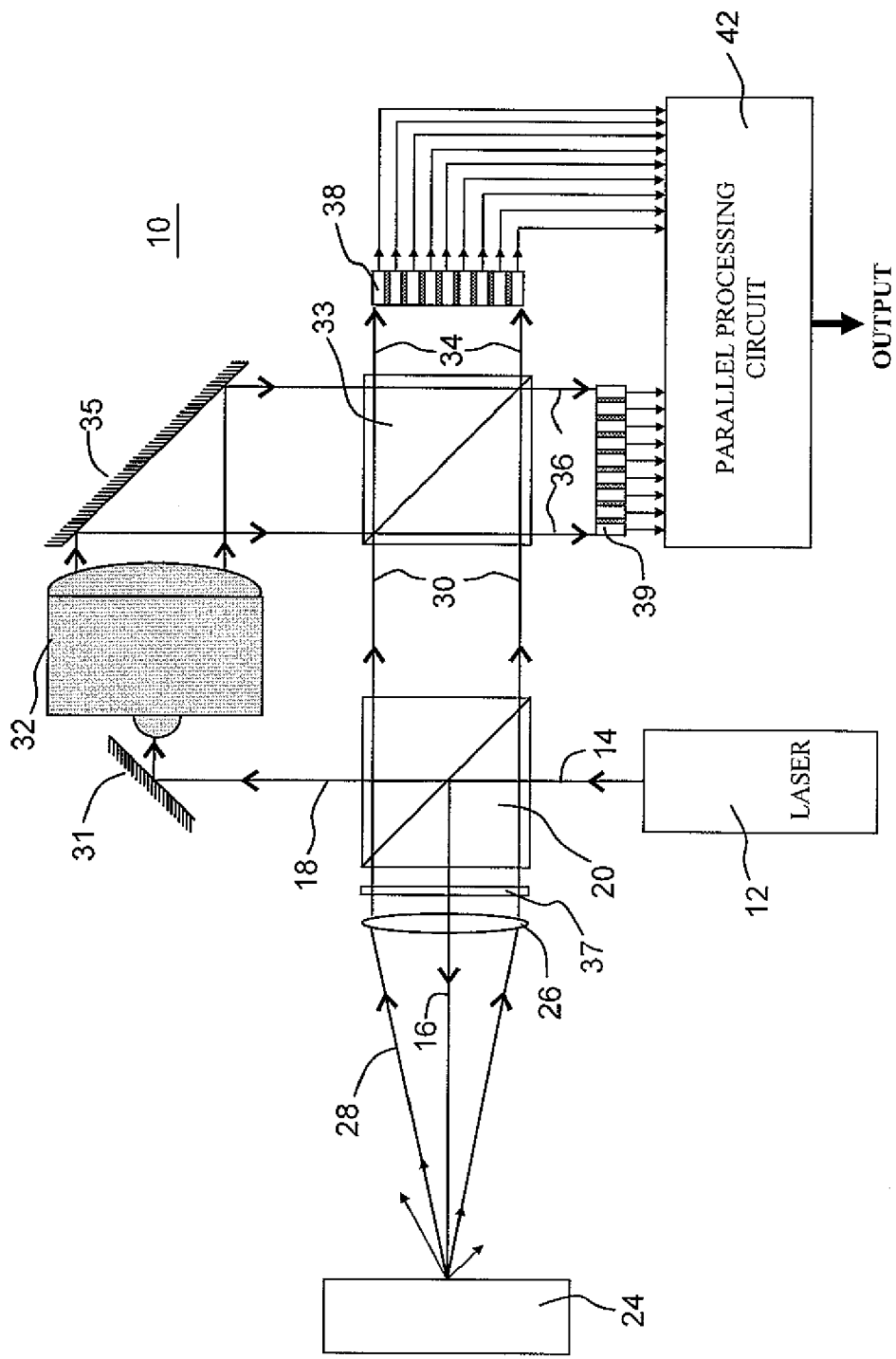
FIG. 1 shows an interferometric apparatus according to a preferred embodiment disclosed herein.

FIG. 1 shows a first preferred embodiment of the interferometric apparatus 10. The interferometric apparatus 10 comprises a laser source 12 that is adapted to generate a laser beam 14 of a given intensity. The laser beam 14 is split into an object beam 16 and a reference beam 18 using a first beam splitter 20. In this embodiment, the object beam 16 is then directed onto a scattering surface of an object 24 subjected to ultrasound using an optical lens 26. The back-scattered light 28 is then collected by the lens 26, thus generating a scattered object beam 30. The intensity of the scattered object beam 30 is much weaker than the intensity of the reference beam 18. Typically, the intensity of the reference beam is 10 to 100 times stronger than the intensity of the scattered object beam.

Still referring to FIG. 1, the reference beam 18 may be expanded by means of a beam expander 32, and directed by means of mirrors 31, 35. The reference beam 18 and the scattered object beam 30 are then combined using a second beam splitter 33, thus forming two interference beams 34, 36. The two interference beams 34, 36 are each received by two detector arrays 38, 39, respectively, and converted into electrical interference signals, which are processed by a parallel processing circuit 42.

As it is explained below, only one of the interference beams 34, 36 could be used. Thus, only one of the arrays of detectors 38, 39 would be necessary. However, it is advantageous to use the two interference beams 34, 36 in order to increase the sensitivity and the efficiency of the interferometric apparatus 10. In a preferred embodiment of the invention, the two interference beams 34, 36 are used. In another embodiment, one of the interference beams 34, 36 is blocked, and only one interference beam is used.

According to a variant of the first embodiment, the first beam splitter 20 is a polarizing beam splitter, dividing the laser beam 14 into two orthogonally linearly polarized object and reference beams 16, 18. A quarter-wave plate 37 is disposed between the polarizing beam splitter 20 and the lens 26, the quarter-wave plate 37 having its optical axis oriented at 45° to the polarization axis of the object beam 16. Then, the scattered object beam 30, when incident on the polarizing beam splitter 20, has a linear or slightly elliptical polarization whose axis is orthogonal to that of the object beam reflected from the polarizing beam splitter 20. The linearly polarized scattered object beam 30 will mostly propagate straight through the polarizing beam splitter 20, and only a small part of the scattered object beam 30 will be reflected back to the laser source 12. Thus, the efficiency of the laser interferometric apparatus 10 is enhanced because most of the available laser light is used for the measurement.

The phases of the portions of the interference beam are random and not correlated with each other due to the speckled interference beam that results from a rough surface of the object whose displacement is measured. Thus, every detector on the detector array 38, 39 receives another speckle pattern with random and non-correlated phases. This property is used according to the invention to reject the laser intensity noise as described below.

Figure 2:
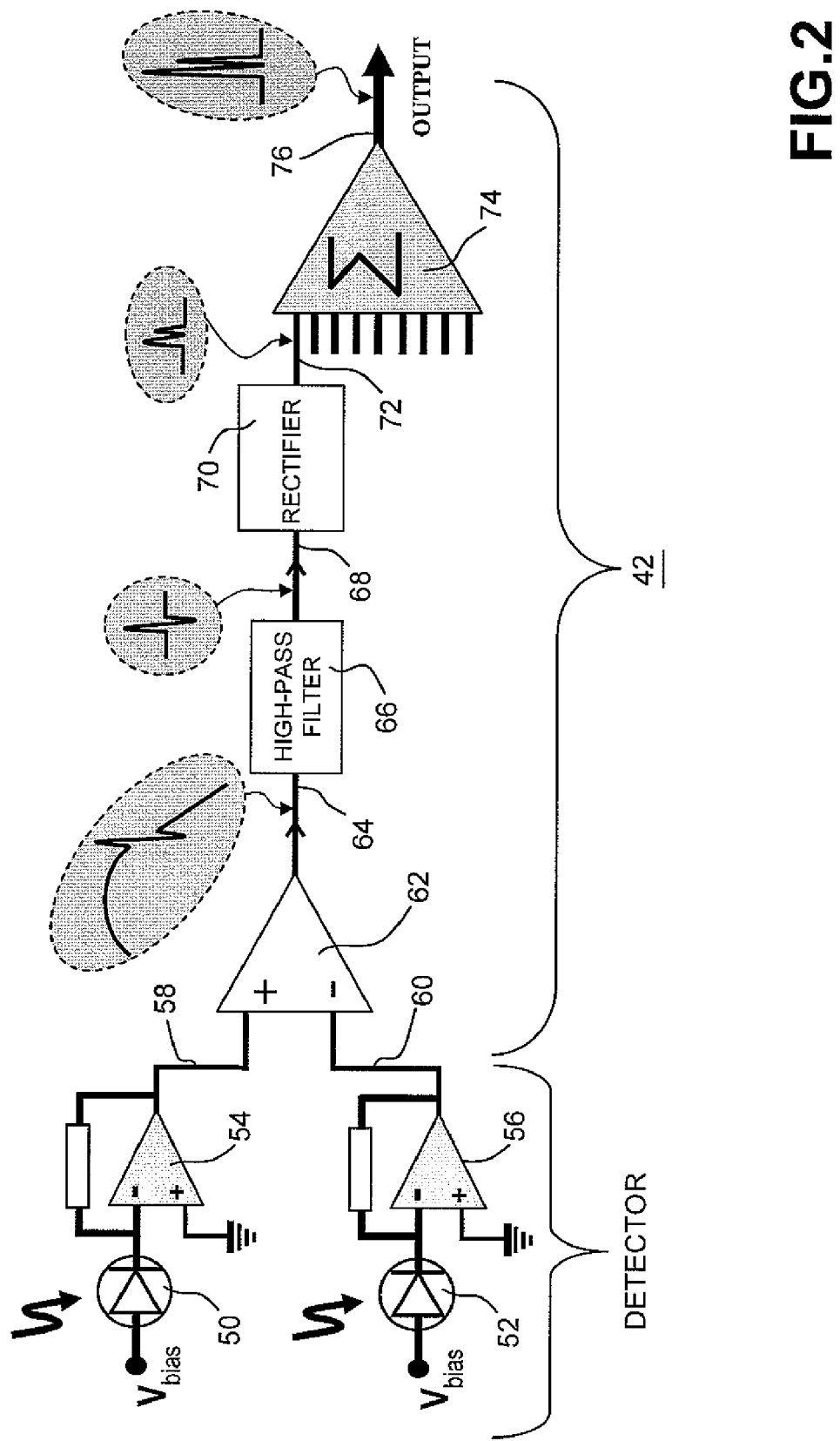
FIG. 2 shows a schematic of a demodulation scheme of the interferometric apparatus according to embodiments disclosed herein.

Referring now to FIG. 2, the processing circuit 42 used for demodulation of electrical interference signals is shown for two detectors by way of example. Each detector may comprise a photodiode element 50, 52 and a transimpedance amplifier 54, 56. The photodiode elements 50, 52 each receive a portion of the interference beam 34 (see FIG. 1), thereby generating a current. Each portion of the interference beam 34 is modulated according to the displacement of the object, and each portion also carries the intensity noise.

The current from the photodiode elements 50, 52 is converted to a voltage by the transimpedance amplifiers 54, 56, thereby generating electrical interference signals 58, 60. Electrical interference signals 58, 60 are then subtracted from each other using a differential amplifier 62 to generate a displacement signal 64. The displacement signal 64 carries information about the displacement of the object, and the intensity noise is substantially rejected thanks to the subtraction step.

In a variant of the first embodiment, the displacement signal 64 is filtered to remove its low frequency components by high-pass filter 66. The filtered signal 68 is then rectified using rectifier 70. The rectified signal 72 and other rectified signals originating from other detectors of the array of detectors then enter a summing amplifier 74, where they are added to produce an average output signal 76. The output signal 76 is indicative of the displacement of the object under test, and it is substantially free of intensity noise. The described demodulation scheme is also referred to as differential detection scheme.

Figure 3:
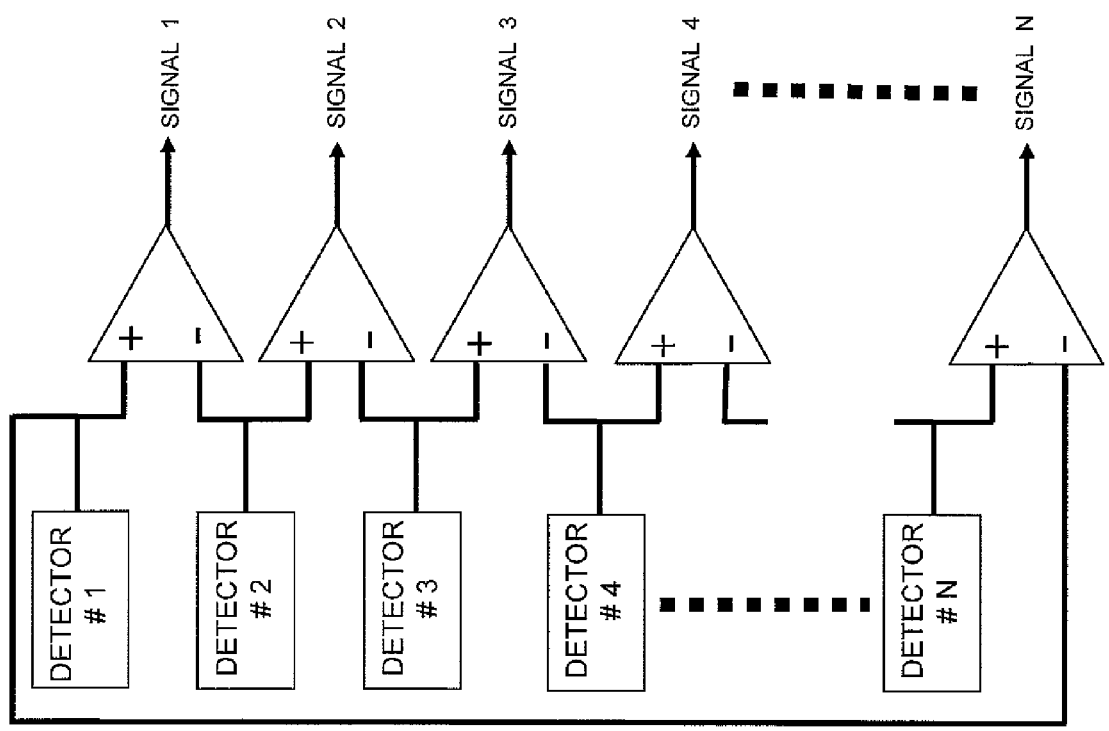
FIG. 3 shows a partial enlarged view of the demodulation scheme of FIG. 2.

FIG. 3 schematically shows one of the arrays of N detectors, the detectors being coupled to N differential amplifiers. The electrical interference signal generated by detector no. 2 is subtracted from the electrical interference signal generated by detector no. 1, and the electrical interference signal generated by detector no. 3 is subtracted from the electrical interference signal generated by detector no. 2, etc. However, it is not necessarily two neighboring detectors that are coupled by one differential amplifier. As the person skilled in the art will appreciate, the detectors and the differential amplifiers may also be coupled in such a way that electrical interference signals generated by detectors that are not neighboring each other are subtracted. The detectors and the differential amplifiers may therefore be coupled according to application-specific requirements, provided that N differential amplifiers are available for N detectors. The greater the value of N, the more stable the output signal will be. It has been found that with N=50, satisfying displacement measurement results can be obtained. For example, the interferometric apparatus may comprise one detector array with 50 detectors or two detector arrays with 25 detectors each. The person skilled in the art will appreciate that N may take other values. However, for the intensity noise rejection, only 2 detectors are needed in order to carry out the subtraction of the electrical interference signals.

Figure 4:
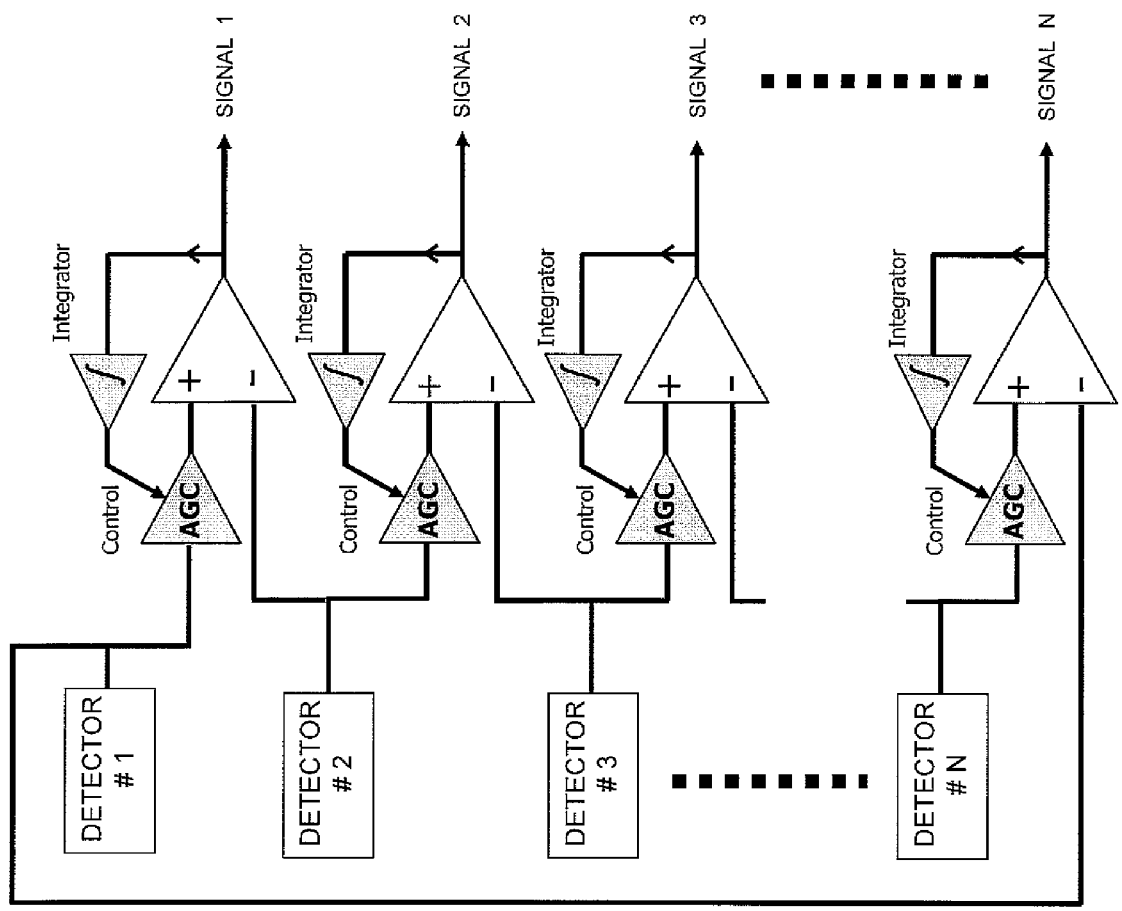
FIG. 4 shows a partial enlarged view of a modified demodulation scheme of the interferometric apparatus according to embodiments disclosed herein.

The processing schematically shown in FIGS. 2 and 3 for rejecting the intensity noise is highly effective if the intensity of the reference beam is uniform and much stronger than the intensity of the scattered object beam. FIG. 4 schematically shows a more complex differential detection scheme according to a variant of the first embodiment. This differential detection scheme does not require the intensity of the reference beam to be uniform or much stronger than the intensity of the scattered object beam. Before differential amplification, the amplitude of one of the electrical interference signals is normalized to the amplitude of the other electrical interference signal, with respect to their DC level, using an automatic gain control (AGC) amplifier. The gain of the automatic gain control amplifier is controlled by an integrator circuit which integrates the DC level of the signal at the output of the differential amplifier. The integrator circuit delivers a control signal in order to maintain the DC level to zero, insuring a high rejection of the intensity noise at the signal at the output of the differential amplifier.

Figure 5:
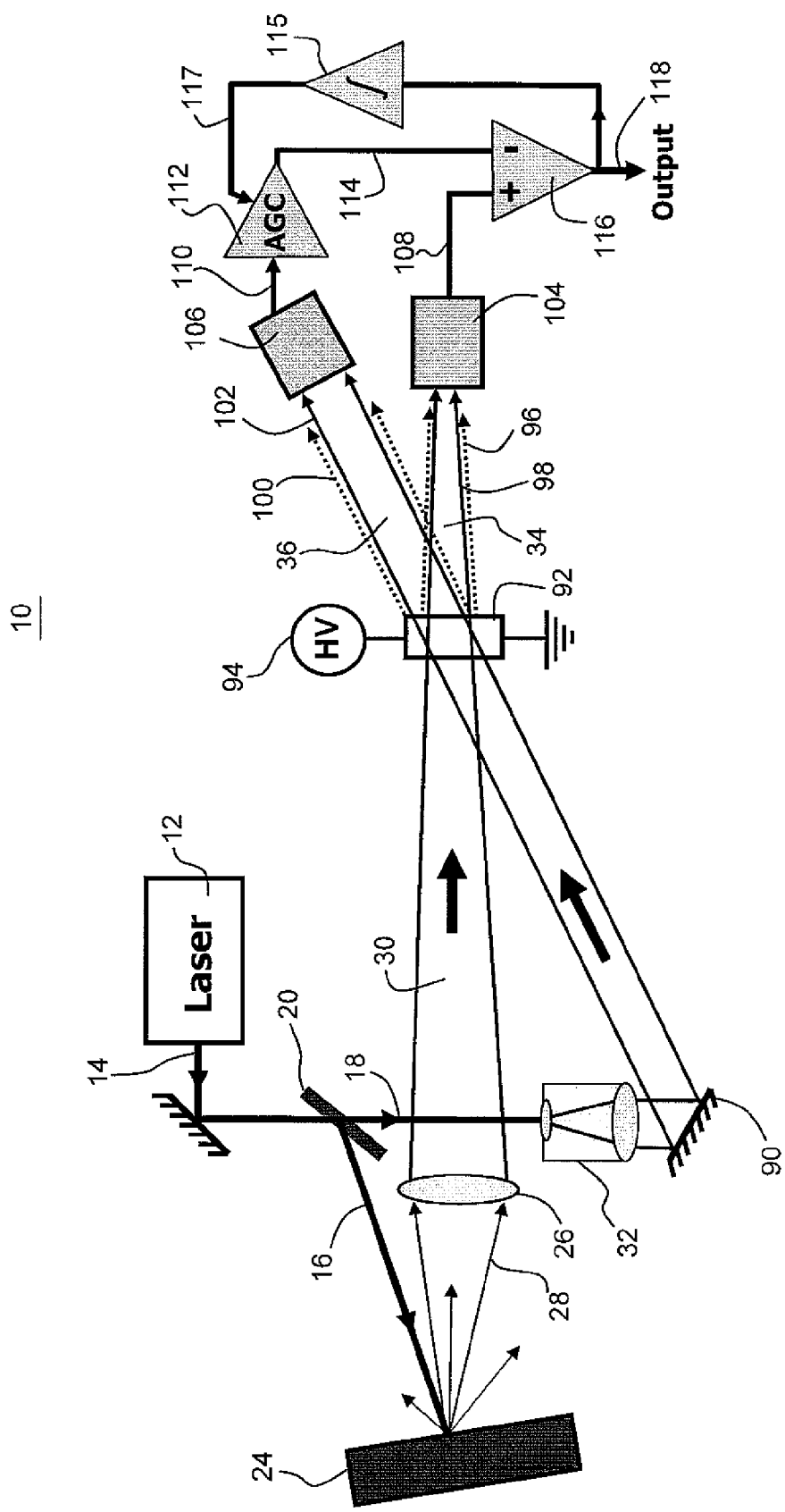
FIG. 5 shows the interferometric apparatus according to another preferred embodiment disclosed herein.

A second preferred embodiment of the interferometric apparatus 10 is shown in FIG. 5. Similarly to the first preferred embodiment, a laser beam 14 of a given intensity is split into an object beam 16 and a reference beam 18 using the first beam splitter 20. The object beam 16 has an intensity representing a major part of the given intensity, and the reference beam 18 has an intensity representing a minor part of the given intensity. For example, the intensity of the reference beam 18 may represent 20% of the given intensity. In this embodiment, the beam splitter 20 is disposed in such a way that the object beam 16 is directed onto a scattering surface of the object 24 subjected to ultrasound. The back-scattered light 28 is then collected by the optical lens 26, thereby generating a scattered object beam 30.

Still referring to FIG. 5, the reference beam 18 may be expanded by means of a beam expander 32 and redirected towards the scattered object beam 30 using a mirror 90. The reference beam 18 and the scattered object beam 30 are arranged to interfere inside a photorefractive crystal 92. As a result, a dynamic diffraction grating builds up in the photorefractive crystal 92. In order to optimize the diffraction efficiency of the grating, the intensity of the reference beam 18 is chosen to be much higher than the intensity of the scattered object beam 30, $I_{ref} \gg I_{obj}$. An electrical field may be applied to the photorefractive crystal 92 via an external voltage 94.

The reference beam 18 and the scattered object beam 30 are transmitted through or diffracted by the diffraction grating. The reference beam 18 will be diffracted in the transmission direction of the scattered object beam 30, and the scattered object beam 30 will be diffracted in the transmission direction of the reference beam 18. The diffracted reference beam 96 interferes with the transmitted scattered object beam 98, and the diffracted scattered object beam 100 interferes with the transmitted reference beam 102, thus forming two interference beams 34, 36.

The first interference beam 34 contains information about the displacement of the object 24. The second interference beam 36 also carries a small modulation from the interference with the scattered object beam 30. However, due to the condition $I_{ref} \gg I_{obj}$, the modulation depth of the second interference beam 36 is much weaker than the modulation depth of the first interference beam 34.

The interference beams 34, 36 are each directed onto a detector 104, 106, respectively. The detectors 104, 106 each provide an electrical interference signal 108, 110. The electrical interference signals 108, 110 are then processed by processing means.

Figure 6:
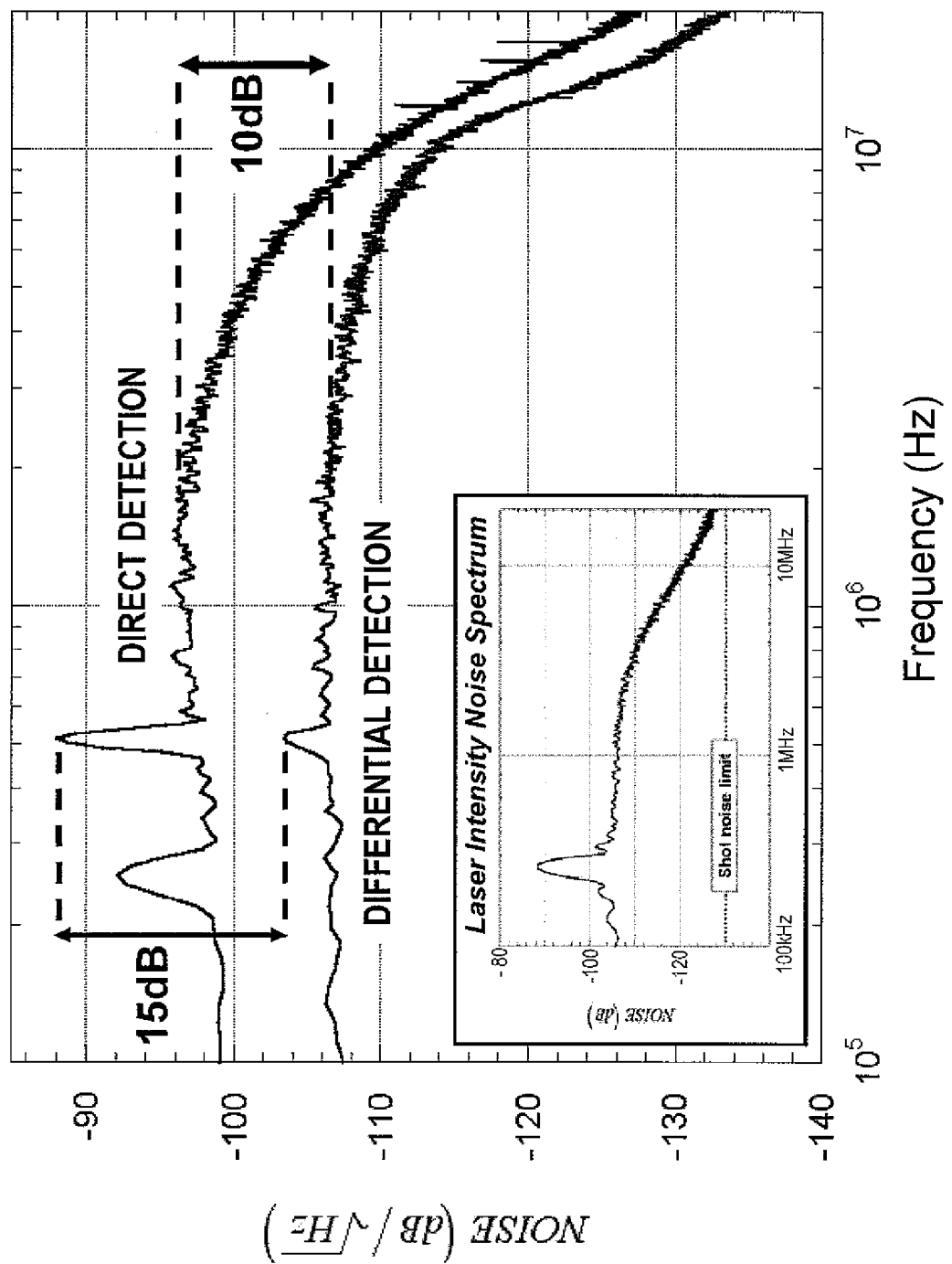
FIG. 6 shows a comparison of intensity noise spectra measured with a prior art interferometer and the interferometric apparatus according to embodiments disclosed herein.

The amplitude of the second electrical interference signal 110, originating from the second interference beam 36, is normalized to the amplitude of the first interference signal 108, originating from the first interference beam 34, with respect to the DC intensities of the interference beams 34, 36 using an automatic gain control amplifier 112. The bandwidth of the automatic gain control amplifier 112 is larger than the bandwidth of the intensity noise to be rejected. The gain of the automatic gain control amplifier 112 is controlled by an integrator circuit 115 which integrates the DC level of the output signal 118. The integrator circuit 115 delivers a control signal 117 used to modify the gain of the automatic gain control amplifier 112, in order to maintain the DC level of the output signal 118 equal to zero. The normalized second electrical interference signal 114 is then subtracted from the first electrical interference signal using a differential amplifier 116, thus generating an output signal 118 which is substantially free of intensity noise. Thus, the intensity noise rejection is due to the intensity difference of the two interference signals An example of laser intensity noise rejection using the first preferred embodiment is shown in FIG. 6. The noise spectrum at the output of a 50-channel interferometer with prior art amplification and with differential amplification is shown, whereby the intensity of portions of the reference beam on each detector of the array is 250 μW. The laser used for this experiment exhibits strong intensity noise below an ultrasound frequency of 10 MHz, with a noise peak at 260 kHz, as shown in the inset in FIG. 6. After demodulation according to prior art, the noise peak appears at 520 kHz because of the rectification step, which doubles the frequency. A 15 dB reduction of this noise peak is achieved with the interferometric apparatus including differential detection according to embodiments disclosed herein. A small noise peak is still visible at 520 kHz, which is mostly due to the spatial variation in the reference beam intensity.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A laser interferometric apparatus for measuring a displacement of an object, the apparatus comprising:

a laser source for producing a laser beam having a given intensity; a first beam splitter for dividing the laser beam into a reference beam and an object beam to be directed to the object, thereby producing a scattered object beam being modulated according to the displacement of the object;

a second beam splitter for combining the scattered object beam and the reference beam, thereby providing at least one interference beam;

at least one array of detectors for receiving the at least one interference beam, each detector of the array receiving a portion of the at least one interference beam to form an electrical interference signal, the electrical interference signal comprising a wanted signal component indicative of the object displacement and a substantially equal intensity noise component; and a processing circuit comprising a differential amplifier for subtracting at least two electrical interference signals formed by at least two portions of the interference beam, thereby generating a displacement signal, the displacement signal comprising substantially the wanted signal component alone, wherein the intensity noise is substantially rejected, wherein each detector contained in the at least one array of detectors comprises an automatic gain control circuit to normalize the amplitude of one of the at least two electrical interference signals to the amplitude of the other of the at least two electrical interference signals.

2. apparatus according to claim 1, wherein the second beam splitter provides two interference beams, the apparatus comprising two arrays of detectors, each array of detectors receiving one of the two interference beams.

3. The apparatus according to claim 2, wherein the at least one array of detectors is a two-dimensional array of detectors.

4. The apparatus according to claim 1, wherein the processing circuit further comprises a filter for filtering the displacement signal and a rectifier for rectifying the filtered displacement signal.

5. The apparatus according to claim 4, wherein the at least one array of detectors is a two-dimensional array of detectors.

6. The apparatus according to claim 1, wherein the at least one array of detectors is a two-dimensional array of detectors.

7. The apparatus according to claim 6, wherein the array of detectors comprises at least 25 detectors.

8. The apparatus according to claim 1, further comprising a summing amplifier for summing the processed electrical interference signals.

9. A laser interferometric apparatus for measuring a displacement of an object, the apparatus comprising:

a laser source for producing a laser beam having a given intensity;

a beam splitter for dividing the laser beam into a reference beam and an object beam to be directed to the object, thereby producing a scattered object beam being modulated according to the displacement of the object;

a photorefractive crystal in which a diffraction grating is provided by the interference of the scattered object beam and the reference beam, whereby the diffraction grating is adapted to transmit and to diffract the scattered object beam and the reference beam, thereby providing an object interference beam resulting from the interference of the transmitted scattered object beam and the diffracted reference beam and a reference interference beam resulting from the diffracted scattered object beam and the transmitted reference beam;

two detectors, each detector receiving respectively one of the object and reference interference beams and being adapted to generate two electrical interference signals, the electrical interference signals each comprising a wanted signal component indicative of the object displacement and a substantially equal intensity noise component; and a processing circuit comprising a differential amplifier for subtracting the two electrical interference signals formed by the object and reference interference beams, thereby generating a displacement signal, the displacement signal comprising substantially the wanted signal component alone, wherein the intensity noise is substantially rejected, wherein the two detectors comprise an automatic gain control circuit to normalize the amplitude of the electrical interference signal corresponding to the reference interference beam to the amplitude of the electrical interference signal corresponding to the object interference beam.

10. The apparatus according to claim 9, wherein the reference beam has a major fraction of the given intensity and the scattered object beam has a minor fraction of the given intensity.

11. The apparatus according to claim 10, wherein the major fraction of the given intensity is at least 10 times greater than the minor fraction of the given intensity.

12. A method for measuring a displacement of an object, the method comprising:

generating a laser beam having a given intensity;

dividing the laser beam into a reference beam and an object beam to be directed to the object, thereby producing a scattered object beam being modulated according to the displacement of the object;

combining the scattered object beam and the reference beam to provide at least one interference beam;

receiving the at least one interference beam with at least one array of detectors, each detector array receiving a portion of the at least one interference beam to form an electrical interference signal, the electrical interference signal comprising a wanted signal component indicative of the object displacement and an intensity noise component; and processing at least two electrical interference signals formed by at least two portions of the interference beam, the processing comprising subtracting the at least two electrical interference signals, thereby generating an output signal, the output signal comprising substantially the wanted signal component alone, wherein the intensity noise is substantially rejected, wherein processing the at least two electrical interference signals further comprises normalizing the amplitude of one of the at least two electrical interference signals to the amplitude of the other of the at least two electrical interference signals using an automatic gain control circuit.

13. The method according to claim 12, further comprising summing the processed electrical signals, thereby generating an output signal comprising substantially the wanted signal component alone, wherein the intensity noise is substantially rejected.

14. The method according to claim 12, wherein processing the electrical interference signals further comprises filtering the electrical interference signals and then rectifying the filtered electrical interference signals.

15. A method for measuring a displacement of an object, the method comprising:

generating a laser beam having a given intensity;

dividing the laser beam into a reference beam and an object beam to be directed to the object, thereby producing a scattered object beam being modulated according to the displacement of the object;

combining the scattered object beam and the reference beam to generate a diffraction grating inside a photorefractive crystal, whereby the diffraction grating is adapted to transmit and to diffract the scattered object beam and the reference beam, thereby providing an object interference beam resulting from the interference of the transmitted scattered object beam and the diffracted reference beam and a reference interference beam resulting from the diffracted scattered object beam and the transmitted reference beam;

receiving the object and reference interference beams with two detectors, each detector receiving respectively one of the object and reference interference beams, thereby generating two electrical interference signals, the electrical interference signals each comprising a wanted signal component indicative of the object displacement and an intensity noise component; and processing the two electrical interference signals, the processing comprising subtracting the two electrical interference signals, thereby generating an output signal, the output signal comprising substantially the wanted signal component alone, wherein the intensity noise is substantially rejected, wherein receiving the interference beams comprises normalizing the amplitude of the electrical interference signal corresponding to the reference interference beam to the amplitude of the electrical interference signal corresponding to the object interference beam using an automatic gain control circuit.

* * * * *